Jan. 14, 1930.                L. HORNBOSTEL                1,743,217
                              FLEXIBLE GEAR WHEEL
                              Filed Dec. 17, 1925

WITNESSES:
C. J. Weller,
W. D. O'Connor

INVENTOR
Lloyd Hornbostel.
BY
ATTORNEY

Patented Jan. 14, 1930

1,743,217

UNITED STATES PATENT OFFICE

LLOYD HORNBOSTEL, OF PITTSBURGH, PENNSYLVANIA, ASSIGNOR TO WESTINGHOUSE ELECTRIC & MANUFACTURING COMPANY, A CORPORATION OF PENNSYLVANIA

FLEXIBLE GEAR WHEEL

Application filed December 17, 1925. Serial No. 75,992.

My invention relates to gear-wheels and more particularly to gear-wheels embodying flexible elements to permit relative movement between the gear rim and the supporting center or hub structure.

An object of my invention is to provide a flexible gear-wheel of simple and durable mechanical construction comprising a minimum number of parts.

Another object of my invention is to provide a flexible gear-wheel in which radial spring pressure is exerted towards the center of the gear-wheel, thereby eliminating the outward pressure and consequent distortion of the gear rim that was the cause of difficulties in structures heretofore utilized.

Another object of my invention is to provide a flexible gear-wheel in which the spring elements have a rising characteristic that may be represented by a smooth or an exponential curve.

The present invention is directed to a flexible gear element comprising annular spring members that are adapted to transmit torque between the outside or gear rim portion and the hub or center portion of the gear element without exerting any outward radial pressure upon the gear rim.

In practicing my invention, I utilize substantially segments of springs that are substantially segments of an annulus and mount them in such manner that the torque transmitted by them is applied to the elements in the form of tension forces at their ends.

Figure 1:
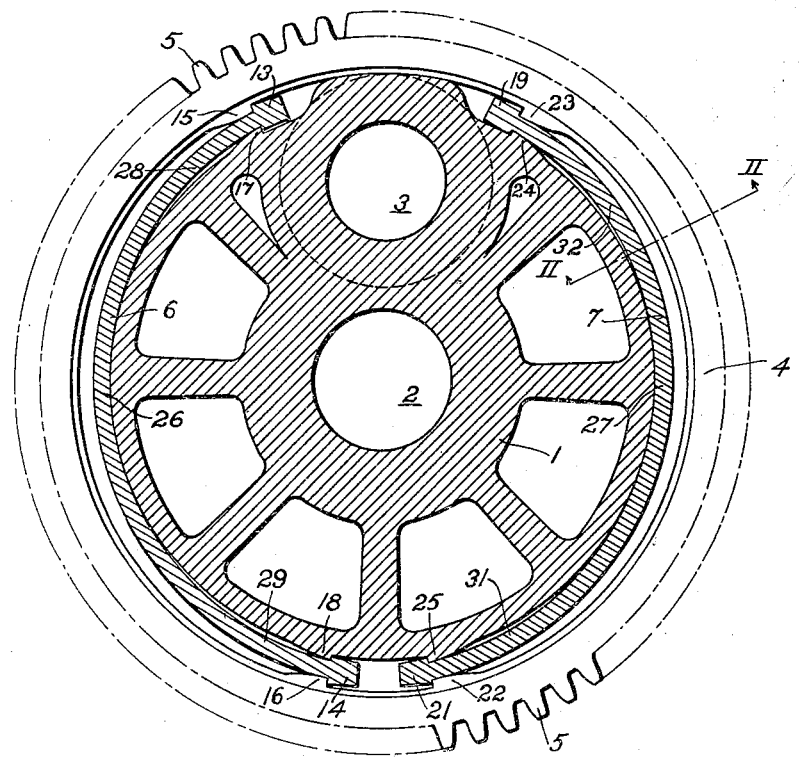
Figure 2:
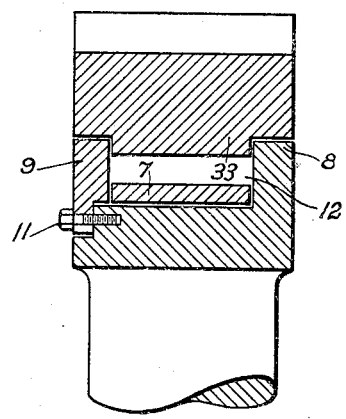

In the accompanying drawing, Figure 1 is a view in cross section of a flexible gear-wheel embodying the principles of my invention; and Fig. 2 is a transverse sectional view thereof taken along the line II—II, Fig. 1.

Referring to the drawing, the gear-wheel therein illustrated comprises a gear center or hub portion 1 having a central opening 2 that constitutes the seat by means of which the gear-wheel is mounted and a crank pin opening 3, whereby the gear-wheel may be operatively connected to one or more driven elements by a connecting rod (not shown).

A gear rim 4 having a toothed outer periphery 5 is operatively connected to the gear center 1 by means of annular spring elements 6 and 7.

The gear rim 4 bears upon a radial flange or cylindrical surface 8 on one side of the gear center 1 and is retained in position by a retaining ring 9 on the other side, which ring is held by bolts 11. The spring elements 6 and 7 are thus enclosed in a chamber or groove 12. The spring element 6 terminates in enlarged heads 13 and 14 that engage with or lock behind lugs 15 and 16 on the inner surface of the gear rim 4 and with lugs 17 and 18 on the gear center 1. The spring element 7 likewise terminates in enlarged head members 19 and 21 that engage with lugs 22 and 23 on the gear rim 4 and lugs 24 and 25 on the gear center 1. As assembled and in their normal position, the spring elements 6 and 7 bear upon points 26 and 27 of the gear center 1, which points are located substantially at the middle of the spring elements.

The operation of this device, and particularly of the spring elements, is briefly as follows: The gear rim member 4 is engaged by a toothed pinion element (not shown) at its outer periphery and torque is transmitted through the rim 4 and lugs 15 and 22 or lugs 23 and 16, depending upon the direction of rotation, to the spring elements 6 and 7. The spring elements 6 and 7 transmit the torque to the gear center 1 by means of the lugs 18 and 24 or the lugs 25 and 17. When the device is thus subjected to a torsional load, the spring elements 6 and 7 deflect tangentially in proportion to the load by conforming to the outer contour of the gear center 1 in the regions of the points 26 and 27 and by straightening somewhat in the end portions 28, 29, 31 and 32. There being no positive connection between the gear rim 4 and the gear center 1, the spring elements 6 and 7 transmit the entire torque therebetween, the characteristics of the mechanism being such that, at high torques, the deflection becomes relatively small in proportion to the load and, therefore, no positive connections or stops are required.

It will be noticed that the spring elements 6 and 7 do not exert outward radial forces upon the gear rim 4, so that there is no danger of distorting it. The deflection for a given load may be varied by changing the difference in radius between the gear center 1 and the spring elements 6 and 7, by changing the shape and size of the spring elements, or by laminating them.

One of the features of the present gear-wheel construction is the ease with which the unit may be assembled. After the gear rim 4 is placed upon the center 1, the spring members 6 and 7 are inserted and engaged with the lugs on the rim and center. The retaining ring 9 is then put in place and bolted by means of the bolts 11, thereby completely enclosing the spring members 6 and 7 in the chamber 12. The gear rim 4 is restrained from lateral movement by a shoulder 33 that projects into the chamber 12.

It is evident from the foregoing description of my invention that flexible gear-wheels made in accordance therewith provide a mechanically simple and durable structure which is adapted to operate without exerting distorting pressures against the gear rim.

Although I have described a specific embodiment of my invention, I do not wish to be limited by the construction herein described, as it is obvious to those skilled in the art that various modifications may be made in the details of construction and in the arrangement and relations of the several co-operating parts without departing from the principles herein set forth.

I claim as my invention:

1. A flexible gear-wheel comprising a center portion, a rim portion, segmental spring elements co-operatively engaging the center and rim portions and means on the center and rim portions for applying tension forces to the spring elements, all of the spring elements being adapted for tangential deflection in tension under torque in either direction.

2. A flexible gear-wheel comprising a center portion, a rim portion, spring elements co-operatively engaging the center and rim portions and means on the center and rim for applying force to the ends of the spring elements, the spring elements being substantially segments of an annulus and being adapted for tangential deflection in either direction by the application of tension forces to all of their ends.

3. A flexible gear-wheel comprising a center portion, a rim portion, annular spring elements co-operatively engaging the center and rim portions and means on the center and rim for exerting tensional forces upon the springs, said center and rim portions being relatively movable in either direction in accordance with variations of the tension in all of said spring elements.

4. A flexible gear-wheel comprising a center portion, a rim portion and annular spring elements cooperatively engaging the center and rim portions, the spring elements being of different radius than the gear center and disposed to bear upon a portion of its surface at all times and to be drawn into contact with other portions of its surface under conditions of tangential deflection.

5. The combination with a gear center, of a gear rim and annular resilient members interposed between the gear center and the gear rim, said resilient members being of a larger radius than the gear center and being disposed in contact with the gear center at their mid-portions at all times.

6. The combination with a gear center, of a gear rim, annular resilient members interposed between the gear center and the gear rim, and means on the center and the rim for exerting force on the resilient members, said resilient members being adapted to deflect by conforming to the outer surface of the gear center when torque is transmitted in either direction.

7. A flexible gear-wheel comprising a center portion, a rim portion and annular spring elements co-operatively engaging the center and rim portions at their ends and mid-portions, said spring elements being of greater radius than the gear center, and connected to the center and rim portions in such manner that they substantially conform to the gear center at their mid-portions, and become substantially straight at their end portions under tangential deflection in either direction.

8. A flexible gear-wheel comprising a center portion, a rim portion and spring elements cooperatively engaging said center and rim portions, said spring elements having substantially the form of segments of an annulus of greater radius than the outer radius of the gear center and being so disposed that they engage the center portion at their mid-portions at all times.

9. A flexible gear-wheel comprising a center portion, a rim portion and annular spring elements, the ends of which cooperatively engage the center and rim portions, said spring elements being of greater radius than the gear center and being in contact with said center at their mid-portions at all times.

10. A flexible gear-wheel comprising a center portion, a rim portion, spring elements having substantially the shape of segments of an annulus, and means on said center and rim portions for engaging the ends of said spring elements to apply tension forces to all of the spring elements when torque is transmitted in either direction by said gear wheel.

11. A flexible gear-wheel comprising a center portion, a rim portion, segmental spring elements and means on the center and rim for exerting tensional forces on the spring elements, said spring elements being adapted to deflect by progressively conforming to the outer contour of said center portion when torque is transmitted in either direction.

12. A flexible gear-wheel comprising a center portion, a rim portion, segmental spring elements, and means on said spring elements for engaging the rim and center portions in such manner that all of the spring elements will be stressed in tension under torque in either direction.

13. A flexible gear-wheel comprising a gear center, a rim portion, lugs on said center and rim portions, and spring elements disposed between said center and rim portions, said spring elements having their ends in engagement with said lugs and their mid-portions in engagement with the outer surface of the gear center at all times.

14. In a flexible gear wheel, in combination, a gear center, a gear rim carried by the gear center, a resilient member for connecting the gear center and rim member for transmitting power and means on the center and rim for exerting force on the resilient member, said resilient member being disposed to be deflected toward the center member when power is transmitted through the gear in any direction.

15. The combination with a gear center, of a gear rim carried by the gear center, curved resilient members for transmitting torque between the gear center and the gear rim and means on the center and rim for exerting force on the resilient members, said resilient members being disposed to engage and deflect by progressively conforming to the outer surface of the gear center when loaded circumferentially in either direction.

16. A flexible gear-wheel comprising a hub, a gear rim carried by the hub, said hub and rim being each provided with lug members, and spring elements each having the shape of a section of an annulus for connecting the hub and rim members, the ends of the spring elements being disposed to engage hub and rim lugs, said spring elements each being at all times in engagement with the outer surface of the hub at a point substantially midway between adjacent lugs on the hub.

17. A flexible gear-wheel comprising a hub, lug members on the hub, a gear rim carried by the hub and provided with lug members and spring elements each having the shape of a section of an annulus presenting ends for engaging the lug members on the hub and the rim, said spring elements being so disposed between the hub and the rim that when no torque is being transmitted by the gear-wheel the spring ends will each engage a lug on the hub and a lug on the rim and a portion of each spring substantially half way between its ends will engage the outer surface of the hub.

18. A flexible gear-wheel comprising, in combination, a hub, a gear rim carried by the hub, resilient members in the form of sections of an annulus for transmitting force between the hub and the rim, said resilient members, hub and rim being disposed with a substantially common axis, means provided on the resilient members for engaging the hub and the rim, and lugs provided on the hub and rim for receiving the engaging means on the resilient members, said lugs being disposed to cause the resilient members to deflect toward the hub, when force is being transmitted in either direction between the hub and the rim, by conforming progressively to the shape of the outer surface of the hub to an extent bearing a definite relation to the force being transmitted.

19. A flexible gear-wheel comprising, in combination, a hub, a gear rim carried by the hub, resilient members each having the shape of a section of an annulus for transmitting force between the hub and the rim, said resilient members, hub and rim being disposed with a substantially common axis, means provided on the resilient members for engaging the hub and the rim, and lugs provided on the hub and the rim for receiving the engaging means provided on the resilient members, said resilient members being disposed to engage the hub at all times at a portion other than the engaging means and to an extent depending on the force being transmitted.

In testimony whereof, I have hereunto subscribed my name this first day of December, 1925.

LLOYD HORNBOSTEL.